US007181195B2

(12) United States Patent
Booth et al.

(10) Patent No.: US 7,181,195 B2
(45) Date of Patent: Feb. 20, 2007

(54) METHOD AND SYSTEM FOR TRACING MISSING NETWORK DEVICES USING HARDWARE FINGERPRINTS

(75) Inventors: Yvonne Watters Booth, Elgin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 10/076,335

(22) Filed: Feb. 14, 2002

(65) Prior Publication Data

US 2003/0153328 A1    Aug. 14, 2003

(51) Int. Cl.
*H04M 1/66* (2006.01)

(52) U.S. Cl. ............. 455/411; 455/414.1; 455/456.1; 340/568.1; 701/207; 709/229

(58) Field of Classification Search .. 455/456.1–456.7, 455/435.1, 556.1, 577, 414.1, 404.1, 404.2, 455/410, 411, 458, 459, 457; 340/5.8, 539.13, 340/539.11, 539.19, 539.25, 573.3–573.4, 340/539.4; 709/218, 219, 217, 224, 229, 709/200, 214, 202; 701/207, 203, 213; 713/200, 713/201, 193, 194
See application file for complete search history.

(56) References Cited

U.S. PATENT DOCUMENTS

| | | | | | |
|---|---|---|---|---|---|
| 3,618,059 | A | * | 11/1971 | Allen | 340/568.1 |
| 5,588,005 | A | * | 12/1996 | Ali et al. | 370/346 |
| 5,631,642 | A | * | 5/1997 | Brockelsby et al. | 340/993 |
| 5,638,423 | A | * | 6/1997 | Grube et al. | 455/411 |
| 5,748,084 | A | * | 5/1998 | Isikoff | 340/568.1 |
| 5,764,892 | A | * | 6/1998 | Cain et al. | 709/200 |
| 5,936,526 | A | * | 8/1999 | Klein | 340/571 |
| 6,031,894 | A | * | 2/2000 | Fleming, III | 379/44 |
| 6,244,758 | B1 | * | 6/2001 | Solymar et al. | 709/224 |
| 6,269,392 | B1 | * | 7/2001 | Cotichini et al. | 709/200 |

(Continued)

OTHER PUBLICATIONS

Andy Patrizio, "Net Address Helps Finger Felons", Wired News, wyslwyg://1/http://www.wired.com/news/technology/0,1282,21431,00.html, Aug. 25, 1999, Copyright © 2001 Wired Digital Inc., a Lycos Network site.

(Continued)

*Primary Examiner*—Charles N. Appiah
(74) *Attorney, Agent, or Firm*—Dillon & Yudell LLP

(57) ABSTRACT

When a piece of network equipment is determined to be stolen or missing, a hardware tracing tool mounted within the network detects the distinctive hardware fingerprints of the missing hardware within Internet traffic and extracts the device's IP address to trace the location of the missing equipment. As Internet messages or data packets cross through servers containing the tracing tool, the data packets are decompiled to retrieve unique identifier indicia (hardware fingerprints), such as a computer's MAC address, for example. The extracted fingerprints are then compared with fingerprints stored in a database of missing hardware using a hashing or mapping function, and the server system is alerted to a match. The IP address of the device transmitting the matching indicia is then extracted to determine the location of the missing or stolen network hardware. In this way, a method of tracing missing network hardware is provided that does not increase the cost of network equipment or unnecessarily effect network bandwidth.

18 Claims, 2 Drawing Sheets

U.S. PATENT DOCUMENTS

| | | | |
|---|---|---|---|
| 6,300,863 B1 * | 10/2001 | Cotichini et al. | 340/5.8 |
| 6,362,736 B1 * | 3/2002 | Gehlot | 340/568.1 |
| 6,498,565 B2 * | 12/2002 | Boulay et al. | 340/572.1 |
| 6,507,914 B1 * | 1/2003 | Cain et al. | 726/35 |
| 6,571,095 B1 * | 5/2003 | Koodli | 455/435.1 |
| 6,594,481 B1 * | 7/2003 | Johnson et al. | 455/410 |
| 6,756,917 B2 * | 6/2004 | Gould et al. | 340/988 |
| 6,804,699 B1 * | 10/2004 | Henrie | 709/203 |
| 6,819,258 B1 * | 11/2004 | Brown | 340/825.49 |
| 6,833,787 B1 * | 12/2004 | Levi | 340/539.13 |
| 6,889,135 B2 * | 5/2005 | Curatolo et al. | 701/207 |
| 6,954,147 B1 * | 10/2005 | Cromer et al. | 340/568.1 |
| 7,047,426 B1 * | 5/2006 | Andrews et al. | 713/155 |
| 2003/0145090 A1 * | 7/2003 | Ostergaard | 709/229 |

OTHER PUBLICATIONS

"zTrace Basic 1.8", wysiwyg://1/http://www.davecentral.com/15746.html, DaveCentral Software Archive, no date listed.

Rob Lemos, "How GUID Tracking Technology Works", ZDNet News Technology News Now, wysiwyg://1/http://zdnet.com/zdnn/stories/news/0,4586,2234550,00.html, Mar. 30, 1999, ZDNet News.

Joel Deane, "Melissa Manhunt Creates Precedent", ZDNet News Technology News Now, wysiwyg://1/http://www.zdnet.com/zdnn/stories/news/0,4586,2237838,00.html, Apr. 6, 1999, ZDNet News.

* cited by examiner

METHOD AND SYSTEM FOR TRACING MISSING NETWORK DEVICES USING HARDWARE FINGERPRINTS

BACKGROUND OF THE INVENTION

1. Technical Field

The present invention relates in general to the field of networking and, in particular, to network hardware inventory control and security. More particularly, the present invention relates to a method and system for tracing missing or stolen network devices.

2. Description of the Related Art

Many electronic devices, such as laptop computers and cellular telephones, are becoming more compact and portable. While such portability is extremely convenient for the user, it has given rise to an increased risk of loss because such devices are easily lost or stolen. Previously, attempts have been made to provide means for retrieving lost or stolen items of various types.

The simplest approach is marking the item with the name and the address of the owner, or some other identification such as a driver's license number. If the item falls into the hands of an honest person, then the owner can be located. However, this approach may not deter a thief who can remove visible markings on the device. Password protection schemes are of dubious value in discouraging theft or retrieving an item. Although the data can be protected from theft, the computer hardware cannot be found or retrieved. Another approach has been to place a radio transmitter on the item. This has been done in the context of automobile anti-theft devices. The police or a commercial organization monitors the applicable radio frequency to try to locate a stolen vehicle. This method is not suitable for smaller items such as cellular telephones or laptop computers. First, it is inconvenient to disassemble such devices in order to attempt to install a transmitter therein. Second, there may not be any convenient space available to affix such a transmitter. Furthermore, a rather elaborate monitoring service, including directional antennas or the like, is required to trace the source of radio transmissions.

For devices having access to a network, there have been some methods devised that use the network to locate the device when it is stolen. For example, one method requires a software program to be installed on a network device that continually contacts a server to give its location. Such preinstalled software is expensive to implement across a large organization. The software package must be installed on all computers or devices to be secured, and network bandwidth is continually consumed by the software systems as they periodically broadcast the computers' locations over the network. This effectively increases the cost of network equipment and decreases the efficiency of the network. Moreover, hard drives are typically reformatted when a computer is stolen, which would effectively erase the tracing program.

Consequently, there is a need for a novel system for tracing computer hardware that reduces the implementation and maintenance costs seen in the prior art. It would be preferable if such a method and system did not require installation of specialized hardware or software on individual network devices, or require periodic reporting of the computer's location.

SUMMARY OF THE INVENTION

To address the above and other shortcomings in the art, the preferred embodiment provides a method and system for tracing a missing or stolen network electronic device that transmits identifying indicia over a global network. The system includes a hardware fingerprint server that can determine identifying indicia for the electronic device that are transmitted by the electronic device during communications over the global network. A monitoring server, wherein the electronic device is connectable to the monitoring server through the global network, monitors communications over the global network to identify data transmitted through said global network that contains the identifying indicia. Upon identification of data transmitted through said global network that contains the identifying indicia, a tracing server determines the location of the electronic device by tracing the source of the identifying indicia within the global network. All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

According to a preferred embodiment, when a piece of network equipment is determined to be stolen or missing, a hardware tracing tool mounted within the network detects the distinctive hardware fingerprints of the missing hardware within Internet traffic and extracts the device's IP address to trace the location of the missing equipment. As Internet messages or data packets cross through servers containing the tracing tool, the data packets are decompiled to retrieve unique identifier indicia (hardware fingerprints), such as a computer's Media Access Control (MAC) address, for example. The extracted fingerprints are then compared with fingerprints stored in a database of missing hardware using a hashing or mapping function, and the server system is alerted to a match. The IP address of the device transmitting the matching indicia is then extracted to determine the location of the missing or stolen network hardware. In this way, a method of tracing missing network hardware is provided that does not increase the cost of network equipment or unnecessarily effect network bandwidth.

Figure 1:
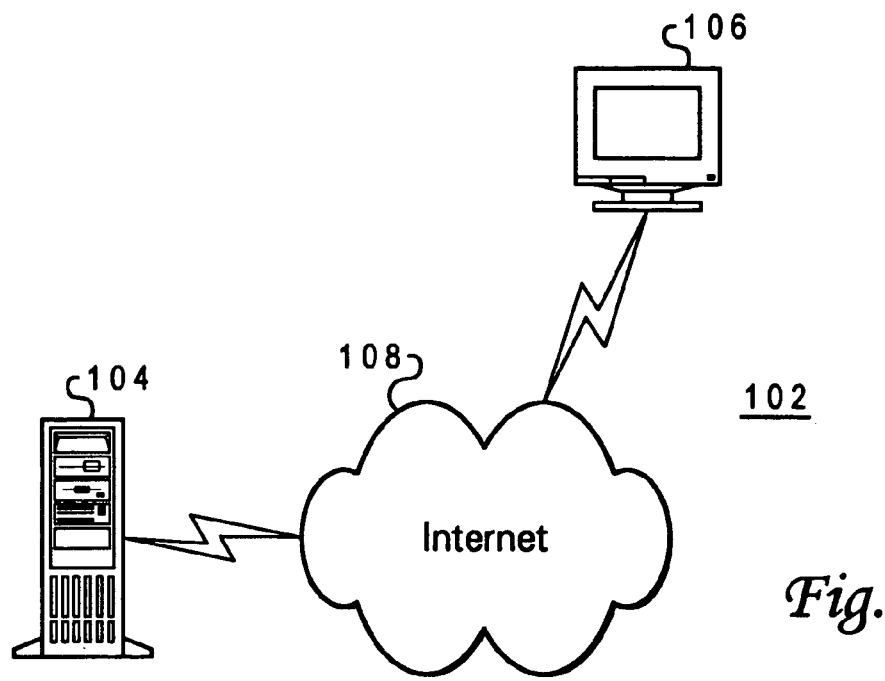
FIG. 1 depicts an illustrative embodiment of a computer network with which the method and system of the present invention may advantageously be utilized.

With reference now to the figures, and in particular with reference to FIG. 1, a data processing system network in which a preferred embodiment of the present invention may be implemented is depicted. Data processing system network 102 includes a server system 104 coupled to a client computer 106 via the Internet 108. Data transfers between the server system 104 and client computer 106 conform to the TCP/IP specification, as well as File Transfer Protocol (FTP), HyperText Transfer Protocol (HTTP), or some similar communications protocol. The Internet has become an important conduit for transmission and distribution of data (text, coded, image, video, audio, or mixed) and software. Users connect to the backbone with broadly divergent levels of performance, ranging from 14.4 Kb/s to more than 45 Mb/s. Moreover, Transmission Control Protocol/Internet Protocol (TCP/IP) has become a widely implemented standard communication protocol, enabling broad heterogeneity between clients, servers, and the communications systems coupling them.

In an embodiment of the invention, client computer 106 may be a laptop computer connected to a private network (such as a LAN), which is connected to a global network such as the Internet 108. Server system 104 is also connected to the Internet 108. In an alternative embodiment of this global network or Internet application, client computer 106 can alternatively, or simultaneously, be coupled to the Internet 108 through a modem, which connects client computer 106 to a telephone line that connects to a Public Switch Telephone Network (PSTN), which provides access to an Internet provider (such as AOL, Netcom, etc.) via a telephone line. Alternatively, client computer 106 may be linked directly to the Internet provider. Although this aspect of the invention is described in the context of the Internet, it will be understood by those skilled in the art that the application of this invention to any wide area network (WAN) or any currently existing or future global network is contemplated herein. Further, it will be understood that the network structured on a wireline, wireless, optical or other medium is contemplated herein. Still further, although the preferred embodiment is described and illustrated with respect to tracing a missing client computer 106, it should be understood that the preferred embodiment is readily applicable to other described devices that have access to a network (including laptop computers, cablevision network control boxes, cellular telephones, personal digital assistants, and other electronic devices).

The Internet 108 is a collection of networks linked together by Internet Protocol (IP) routers and high speed digital links. Computers which have access to one of these networks can run Internet applications to send and retrieve digitally recorded files such as email, audio and video files, and to access web pages. Some of the popular Internet applications are Netscape (used to surf the web), Eudora (for e-mail), Telnet (for logging on to another computer), and Ping (Internet utility for checking the status of a particular machine). These Internet applications can be run simultaneously. Thus, a computer can be running client programs such as Eudora and Netscape and at the same time be an FTP Server (File Transfer) for other clients that want to transfer files. The applications share the same communications links to the Internet and computer resources (processor and memory). With each of these communications, the client computer places data packets on to the Internet that contain information that can uniquely identify the client computer.

Each computer linked to the Internet has a unique Internet host name/IP address. Computer networks comprising one or more of these computers are also given names to form a hierarchical naming structure. For instance, the web site for IBM is "www.ibm.com." The prefix "www" is the name of the computer (server) which is attached to the ibm.com network. Addresses could be coded using numbers, but this would make administration of the Internet extremely difficult. Instead, a method providing for the mapping of internet host names to network addresses was implemented. This mapping system is the Domain Name System (DNS). It is a distributed, hierarchical administrative system. At the top of the hierarchy is the root domain containing the top level domains (com, edu, net, ca, us, etc.). At the bottom end is a domain name such as cs.berkeley.edu. which corresponds to the computer science department of the University of California at Berkeley. Each domain has more than one authoritative server or world wide web server, which can map its Internet host name to its IP (numerical) address.

If a user wants to access the site at www.psmith.cs.berkeley.edu from the address pliving.absolute.com, the user would first input www.psmith.cs.berkeley.edu. into his web browser. The web browser would then send a DNS query to the absolute.com authoritative server to determine if the desired address had been recently resolved (DNS resolutions are cached to enhance the performance of the DNS system). If the absolute.com DNS server cannot resolve this address, then the next DNS server up the chain is checked (the DNS server at the "com" level). If that higher level server also cannot resolve the address, then the root server directs the process down the chain to the top level "edu" DNS server. If the "edu" DNS server cannot resolve the address, then the DNS server at berkeley.edu is contacted. Ultimately, a DNS server is found that can determine the appropriate IP address based on the Internet host name. The IP address is provided to the web browser to enable communication with www.psmith.cs.berkeley.edu.

Once the desired IP address has been determined, packets of data can be sent across the Internet through IP routers contained in Internet 180. Server system 104 can perform as an IP router and a world wide web server. These IP routers can read the numerical addresses and determine where to send each packet. Each IP router has a unique IP address. Typically, several IP routers need to be contacted to link a user with his desired Internet site.

Figure 2:
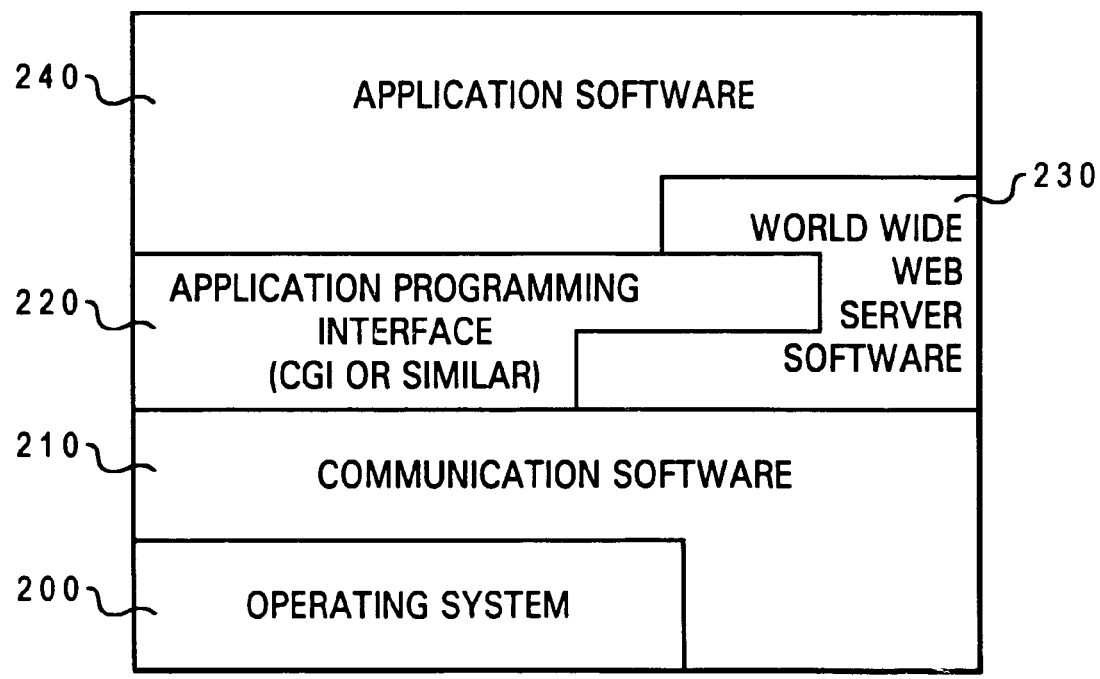
FIG. 2 shows a depiction of a typical software architecture for a world wide web server within which a preferred embodiment of the present invention may be practiced.

FIG. 2 is a depiction of a typical software architecture for a world wide web server, as may be utilized in a preferred embodiment of the present invention. At the lowest level, an operating system is utilized to provide high-level functionality to the user and to other software. Such an operating system typically includes a BIOS (Basic Input Output System). Communication software 210 provides communications through an external port to a network by either directly invoking operating system functionality or indirectly, bypassing the operating system (as shown on the right of block 210) to access the hardware for communications over the network. Item 220 represents an application programming interface. This allows the user, be it an individual or a software routine, to invoke system capabilities using a standard consistent interface without concern for how the particular functionality is implemented. World wide web server software 230 represents any one of several standard commercial packages available for equipping a computer with world wide web server functionality. The application software 240 represents any number of software applications designed to react to data through the communications port to provide the desired functionality the client seeks. Applications at this level may include those necessary to handle one or more home pages which can be accessed by users of the world wide web server. In a preferred embodiment, a specialized software application running in application software 240 implements the process of the preferred embodiment as presented in FIG. 3. However, it will be understood by those skilled in the art that the invention may be implemented in the firmware, software or circuitry of any hardware of any server or router connected to the Internet or other global network.

Figure 3:
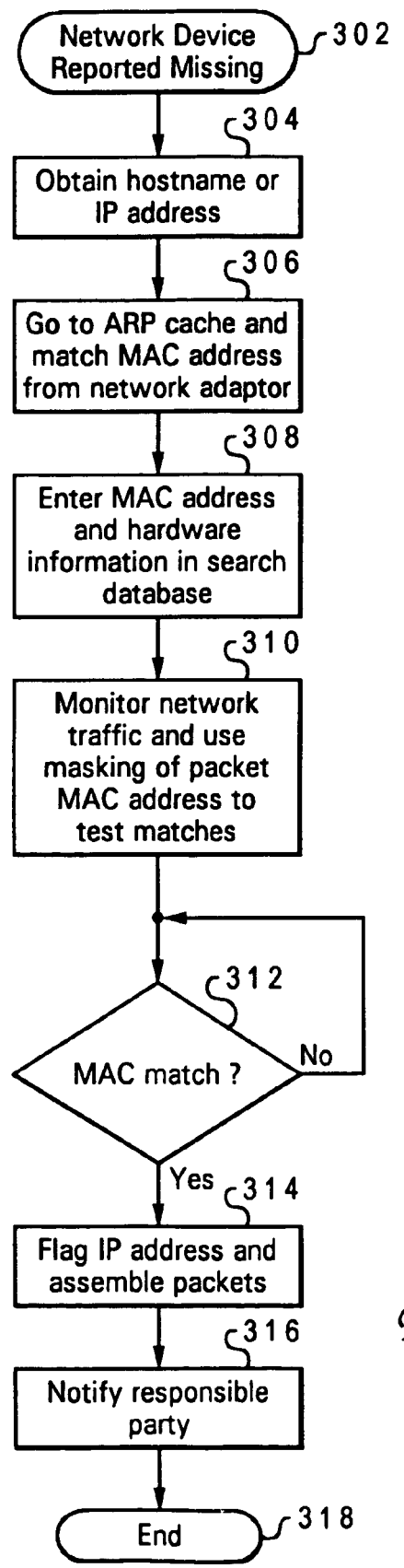
FIG. 3 shows a flowchart of the process for locating missing or stolen network hardware, according to a preferred embodiment of the present invention.

With reference now to FIG. 3, there is shown a flow diagram of the process for tracing a missing network device, in accordance with a preferred embodiment of the present invention. The process begins at step 302 when a network device is reported missing. In accordance with the preferred method of the present invention, when a piece of network equipment is determined to be missing or stolen, its unique hardware "fingerprint" or identifier must be determined. Most computers and other network devices contain unique, distinctive identifiers that are transmitted across the Internet during normal network transactions. For example, network cards contained in most computers have a unique media access control (MAC) address that is included in data packets transmitted by the computer over the network. Also, for example, some Intel processors are identified by a unique Intel System ID that is utilized by various software packages and is included as part of data transmissions by the processor. In some cases, an organization will have previously developed a database of hardware fingerprints for each of their network devices. However, in other cases, the hardware fingerprint must be determined after the device becomes missing.

A unique hardware fingerprint for the missing device can be found by accessing network servers that have previously routed network communications for the missing device. Such network servers retain significant amounts of data in their memories regarding routed network traffic. By reviewing previously transmitted network data packets transmitted by the missing network device, a unique fingerprint for the device (for example, its MAC address) can be determined after the device has been stolen or missing and is no longer accessible. Similarly, a fingerprint can be extracted from emails that have been previously sent by the network device.

In accordance with a preferred embodiment, the previous hostname or IP address of the network device is determined in order to retrieve its past data transmissions. Consequently, as seen in FIG. 3, the process proceeds to step 304, where the hostname or IP address of the missing computer is obtained. In network environments using Static IP Addresses, the IP address of the missing device can be extracted from Address Resolution Protocol (ARP) Cache. TCP/IP uses the Address Resolution Protocol (ARP) to convert IP addresses to MAC, or hardware, addresses. The ARP utility queries and controls the functions of the cached addresses that the ARP protocol has previously resolved. ARP is typically included with server operating systems. Reviewing the ARP cache is useful when trying to resolve fixed hardware addresses of machines with the same IP address, as well as when trying to determine proper configuration of subnet mask and default gateway. If attempting to communicate with a machine not on a local network, the ARP cache contains the MAC address of the default gateway. The default gateway's MAC address is the address that the data packet should be sent to when the destination network address isn't on the same network.

Traceroute is a utility which uses the same basic technique as PING (ICMP packet) to determine the path that a packet takes through a network. By manipulating the time-to-live field within the TCP/IP packet, Traceroute forces routers to progressively report their addresses. This utility is useful for identifying where a routing error or disconnection exists. A routing error will result in a loop, which can be seen as the same routers coming up again and again in the same sequence. A disconnection will be seen as a final router reporting that the destination host isn't available. In this way, each host on a network can be accessed by looking at the kernel's ARP cache to determine the IP-to-MAC address mapping.

In network environments using Dynamic Host Configuration Protocol (DHCP), IP addresses are automatically assigned to deliver TCP/IP stack configuration parameters such as the subnet mask and default router, and to provide other configuration information such as the addresses for printer, time and news servers. In DHCP environments, the ARP cache maintains lease times on assigned IP addresses of up to four days for a direct connection. For dial-up connections, the DHCP lease time of the IP address is often less than an hour. Then, at step 306, the ARP cache of the network router that is known to have transmitted network traffic for the missing device is searched. The device's hostname or ID address will index within the ARP cache to previous data packet transmissions of the network device. From the data packets, a unique hardware fingerprint of the lost or stolen network device is extracted—such as the MAC address of the network adapter card contained within the missing device. If the device is reporting missing after a significant period time since its last access to the Internet, the ARP cache may have been flushed. In this case, the process would obtain the hardware fingerprint of the missing device through an alternative method. For example, previous emails sent from the missing device or other artifacts sent over the network can be extracted from other receiving network machines, and then the device's MAC address or other hardware fingerprint can be extracted therefrom.

In step 308, the determined MAC address or other hardware fingerprint information is entered into a search database within one or more of the network servers. Additional information such as the asset number, model, make, serial number, accessories, or owner may also be entered into the database as additional reference information. The process then proceeds to step 310, where the network servers running this tracing software application monitor network traffic and search for data packets that contain a hardware fingerprint matching a fingerprint within the search database. It is preferred that the tracing software be operating on a large number of servers monitoring Internet traffic, since the more servers on the Internet that are loaded with the tracing software of the preferred embodiment, the more likely that network traffic coming from the stolen or missing network device will cross a server searching for its unique fingerprint. In a preferred embodiment, data packets are masked against the MAC address in the search database to test for matches.

At decision block 312, the process continues to iterate until there is a hardware fingerprint match between the masked data packets and a database MAC address. At some time, it is expected that the stolen or missing device will be plugged into a network and will access a monitored intranet or the Internet, thereby, unknown to the thief or unknowing user of the missing device, transmitting data packets over the network containing the device's hardware fingerprint.

Once the network server is alerted that the missing machine has been used on the network, the rest of the network enveloping information in the missing machine's Internet traffic is used to attempt to isolate the computer's location. The intercepted data packets are decompiled and are used to trace the route through which the data has traveled and to extract the IP address from which they originated. In accordance with the preferred embodiment, when a match is discovered in the Internet traffic for the hardware fingerprint of a device listed in the missing equipment database, a tracing software routine is initiated in a network server that determines the Internet communication links that were used to connect the missing network device to the network server. These Internet communication links will assist the network server in tracking the network device and obtaining its IP address. The IP address of the source, of a DNS query is sent to the host within the DNS query that starts the intercepted network traffic. However, if the source of the query is transmitted through a "proxy" server, then the IP address of the client computer (which may not be unique since it may not have been assigned by the InterNIC) will likely be insufficient to track the location of the client computer. In such a scenario, it is necessary to determine the addresses of other IP routers which were accessed to enable communication between the client and the host. These addresses and the times that they were accessed are compared with internal logs of the proxy server which record its clients' Internet access history. In this way, the client can be uniquely identified and located.

Referring to FIG. 3, this tracing functionality is shown at step 314, where the missing device's IP address is determined from the network traffic (i.e. network transmitted data packets) of the matching device and the network traffic from this IP address is intercepted. The network server then uses "spyware" applications (for example, International Business Machines Corporation's "DataGlance" software product) to monitor all data traffic coming from the extracted IP address.

The process then proceeds to step 316, where the responsible parties listed in the database for the matched device are notified. For example, responsible parties would be the network device's owner and government authorities such as the Federal Bureau of Investigation. The interrupted data packets are assembled to extract out traceable data, such as the user's access provider, email address or other identifying information that will allow the network device owner and government authorities to determine who has possession of the missing hardware and is using it on the network. This information can then be used by the responsible parties to retrieve the lost or stolen network equipment. The process then ends at step 318.

As will now be appreciated, the method and system of the preferred embodiment provides a hardware tracing tool mounted within the network that detects the distinctive hardware fingerprints of missing hardware within Internet traffic and the IP address of the missing device extracted to determine the location of the missing or stolen network hardware. Advantages of the embodiment include that specialized software, firmware or a unique hardware identifier does not need to be installed on each of the network devices to be monitored, nor does a database of identifiers need to be maintained. Missing network hardware is traced using standard hardware identifiers previously instantiated in computers and other network devices by their manufacturers. Moreover, the preferred embodiment does not consume valuable network bandwidth by requiring the transmission of periodic notification and acknowledge data packets between the network device and the server. Consequently, unlike prior art methods of tracing missing or stolen hardware, the method and system of the preferred embodiment does not increase the cost of network equipment or adversely affect network bandwidth.

This invention has been described in a preferred embodiment with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention. While the invention has been particularly shown and described with reference to a preferred embodiment, it will be understood by those skilled in the art that various changes in form and detail may be made therein without departing from the spirit and scope of the invention.

What is claimed is:

1. A method for determining a position of an electronic device within a wide area network including the electronic device and additionally including first and second network elements, said method comprising:
   distributing a tracing tool to the first network element within said wide area network;
   detecting a physical separation of said electronic device and an associated user;
   determining identifying indicia of said electronic device, wherein said identifying indicia are automatically transmitted by said electronic device during communication on the wide area network between said electronic device and the second network element;
   the first network element monitoring traffic on said wide area network utilizing said tracing tool, wherein said monitoring includes:
      in response to detecting said physical separation, the first network element intercepting data of said communication on the wide area network between said electronic device and said second network element, said data including said identifying indicia; and
      determining a physical position of said electronic device within said wide area network in response to an interception of said identifying indicia.

2. The method of claim 1, wherein determining said identifying indicia of said electronic device comprises:
   identifying data transmitted by said electronic device prior to said physical separation utilizing a portion of said wide area network; and
   extracting said identifying indicia from data transmitted by said electronic device prior to said physical separation.

3. The method of claim 1, wherein determining said identifying indicia of said electronic device comprises determining a media access control (MAC) address of said electronic device.

4. The method of claim 1, wherein determining said identifying indicia of said electronic device comprises:
determining said identifying indicia utilizing at least one of a set including a hostname and an Internet Protocol (IP) address within data transmitted by said electronic device prior to said physical separation utilizing a portion of said wide area network.

5. The method of claim 1, wherein:
said method further comprises causing data specifying said identifying indicia to be stored within a database associated with said first network element prior to said physical separation, and
determining said identifying indicia of said electronic device comprises determining said identifying indicia utilizing said database.

6. The method of claim 1, said method further comprising generating a notification indicating said physical position of said electronic device for a responsible party associated with said electronic device.

7. The method of claim 1, wherein said distributing comprises distributing said tracing tool to a plurality of network elements within said wide area network.

8. The method of claim 7, wherein said distributing further comprises distributing said tracing tool to a plurality of Internet protocol routers within said wide area network.

9. The method of claim 1, wherein determining said physical position of said electronic device within said wide area network in response to said interception of said identifying indicia comprises:
transmitting a link tracing message between said electronic device and said first network element;
identifying a third network element coupled between said electronic device and said first network element in response to a transmission of said link tracing message; and
determining said physical position of said electronic device utilizing an identity of said third network element coupled between said electronic device and said first network element.

10. A system for determining a position of an electronic device within a wide area network including the electronic device and at least an additional second network element, said system comprising:
a hardware fingerprint server to determine identifying indicia of said electronic device, wherein said identifying indicia are automatically transmitted by said electronic device during communication on the wide area network between said electronic device and the second network element;
a monitoring server to detect a physical separation of said electronic device and an associated user and further to monitor traffic on said wide area network, wherein said monitoring server includes:
an intercept module, responsive to a detection of said physical separation, to intercept data of said communication on said wide area network between said electronic device and said second network element, said data including said identifying indicia; and
a tracing server to determine a physical position of said electronic device within said wide area network in response to an interception of said identifying indicia at said intercept module.

11. The system of claim 10, wherein said hardware fingerprint server is configured to:
identify data transmitted by said electronic device prior to said physical separation utilizing a portion of said wide area network; and
extract said identifying indicia from said data transmitted by said electronic device prior to said physical separation.

12. The system of claim 10, wherein said identifying indicia of said electronic device comprises a media access control (MAC) address of said electronic device.

13. The system of claim 10, wherein said monitoring server is distributed among a plurality of network elements within said wide area network.

14. A machine-readable medium having embodied therein program code executable by a machine, wherein said program code causes said machine to perform a method for determining a position of an electronic device within a wide area network including the electronic device and additionally including first and second network elements, said method comprising:
detecting a physical separation of said electronic device and an associated user;
determining identifying indicia of said electronic device, wherein said identifying indicia are automatically transmitted by said electronic device during communication on the wide area network between said electronic device and the second network element;
the first network element monitoring traffic on said wide area network at said first network element utilizing a tracing tool, wherein said monitoring comprises:
in response to detecting said physical separation, the first network element intercepting data of said communication on the wide area network between said electronic device and said second network element, said data including said identifying indicia; and
determining a physical position of said electronic device within said wide area network in response to an interception of said identifying indicia.

15. The machine-readable medium of claim 14, wherein said method includes distributing said tracing tool to a plurality of Intenet Protocol routers within said wide area network.

16. The machine-readable medium of claim 14, wherein determining said identifying indicia of said electronic device comprises:
identifying data transmitted by said electronic device prior to said physical separation utilizing a portion of said wide area network; and
extracting said identifying indicia from said data transmitted by said electronic device prior to said physical separation.

17. The machine-readable medium of claim 14, wherein determining said identifying indicia of said electronic device comprises determining a media access control address of said electronic device.

18. The machine-readable medium of claim 14, wherein determining said physical position of said electronic device within said wide area network in response to said interception of said identifying indicia comprises:
transmitting a link tracing message between said electronic device and said first network element;
identifying a third network element coupled between said electronic device and said first network element in response to a transmission of said link tracing message; and
determining said physical position of said electronic device utilizing an identity of said third network element coupled between said electronic device and said first network element.

* * * * *